US008350962B2

(12) United States Patent
Yang et al.

(10) Patent No.: US 8,350,962 B2
(45) Date of Patent: Jan. 8, 2013

(54) METHOD AND SYSTEM FOR VIDEO FORMAT CONVERSION

(75) Inventors: Genkun Jason Yang, Saratoga, CA (US); Yao-Hua Steven Tseng, Fremont, CA (US)

(73) Assignee: Broadcom Corporation, Irvine, CA (US)

( * ) Notice: Subject to any disclaimer, the term of this patent is extended or adjusted under 35 U.S.C. 154(b) by 1141 days.

(21) Appl. No.: 12/030,564

(22) Filed: Feb. 13, 2008

(65) Prior Publication Data
US 2009/0201416 A1   Aug. 13, 2009

(51) Int. Cl.
*H04N 7/01* (2006.01)
(52) U.S. Cl. ........................................................ 348/445
(58) Field of Classification Search ................. 382/600; 345/719, 629
See application file for complete search history.

(56) References Cited

U.S. PATENT DOCUMENTS

| 6,873,341 | B1 * | 3/2005 | Adams et al. .................. 345/629 |
| 7,379,626 | B2 * | 5/2008 | Lachine et al. ................ 382/300 |
| 7,925,007 | B2 * | 4/2011 | Stokes et al. ............. 379/406.08 |
| 2004/0201608 | A1 * | 10/2004 | Ma et al. ........................ 345/719 |
| 2006/0028541 | A1 * | 2/2006 | Haraguchi ....................... 348/27 |

* cited by examiner

*Primary Examiner* — Daniel Washburn
*Assistant Examiner* — Kyle Zhai
(74) *Attorney, Agent, or Firm* — Thomas Horstemeyer, LLP

(57) ABSTRACT

Described herein is a method and system for video format conversion. Aspects of the current invention may convert decoded video data from 4:2:2 format to 4:4:4 format. Aspects of the current invention may also convert decoded video data from 4:2:0 format to 4:4:4 format. Aspects of the current invention may further convert decoded video data from 4:2:0 format to 4:2:2 format. Aspects of the current invention may provide a region-aware conversion system that monitors the edges of mosaic windows in order to apply proper boundary conditions during the conversion process.

25 Claims, 5 Drawing Sheets

METHOD AND SYSTEM FOR VIDEO FORMAT CONVERSION

RELATED APPLICATIONS

[Not Applicable]

FEDERALLY SPONSORED RESEARCH OR DEVELOPMENT

[Not Applicable]

MICROFICHE/COPYRIGHT REFERENCE

[Not Applicable]

BACKGROUND OF THE INVENTION

Video communications systems are continually being enhanced to meet requirements such as reduced cost, reduced size, improved quality of service, and increased data rate. Optimization of the communication system's requirements may be dependent on the video processing application.

In a mosaic mode video application, the screen may simultaneously display one or more video windows. These small video windows are typically smaller than the screen size and may be arranged in any way on the display screen. For example, the small video windows may be displayed as an array of windows on a background or intertwined with each other.

Limitations and disadvantages of conventional and traditional approaches will become apparent to one of ordinary skill in the art through comparison of such systems with the present invention as set forth in the remainder of the present application with reference to the drawings.

BRIEF SUMMARY OF THE INVENTION

Described herein are system(s) and method(s) for video format conversion, substantially as shown in and/or described in connection with at least one of the figures, as set forth more completely in the claims.

These and other advantages and novel features of the present invention will be more fully understood from the following description.

DETAILED DESCRIPTION OF THE INVENTION

According to certain aspects of the present invention, a system and method are presented for video format conversion.

Pixel color in a video display may be represented by different color spaces. For example, the RGB color space has three color components (Red, Green, and Blue) that can be added together in various combinations to create any other color. Another color space, YUV, stores the color in the same way the human brain works. The primary visual aspect that the human brain acknowledges is brightness corresponding to the Luma, Y, component. Chromaticity is stored in the Chroma Blue, Cb or U, component and the Chroma Red, Cr or V, component. Each YUV component can be derived from a linear combination of RGB components. Likewise, each RGB component can be derived from a linear combination of YUV components.

In a digital picture, the color component levels are represented by a fixed number of bits. For example, 8-bit color will represent the color component ranges as 0 to 255. In the RGB color space, white can be 255,255,255 and black can be 0,0,0. In the YUV color space, white can be 255,128,128 and black can be 0,128,128.

Figure 1:
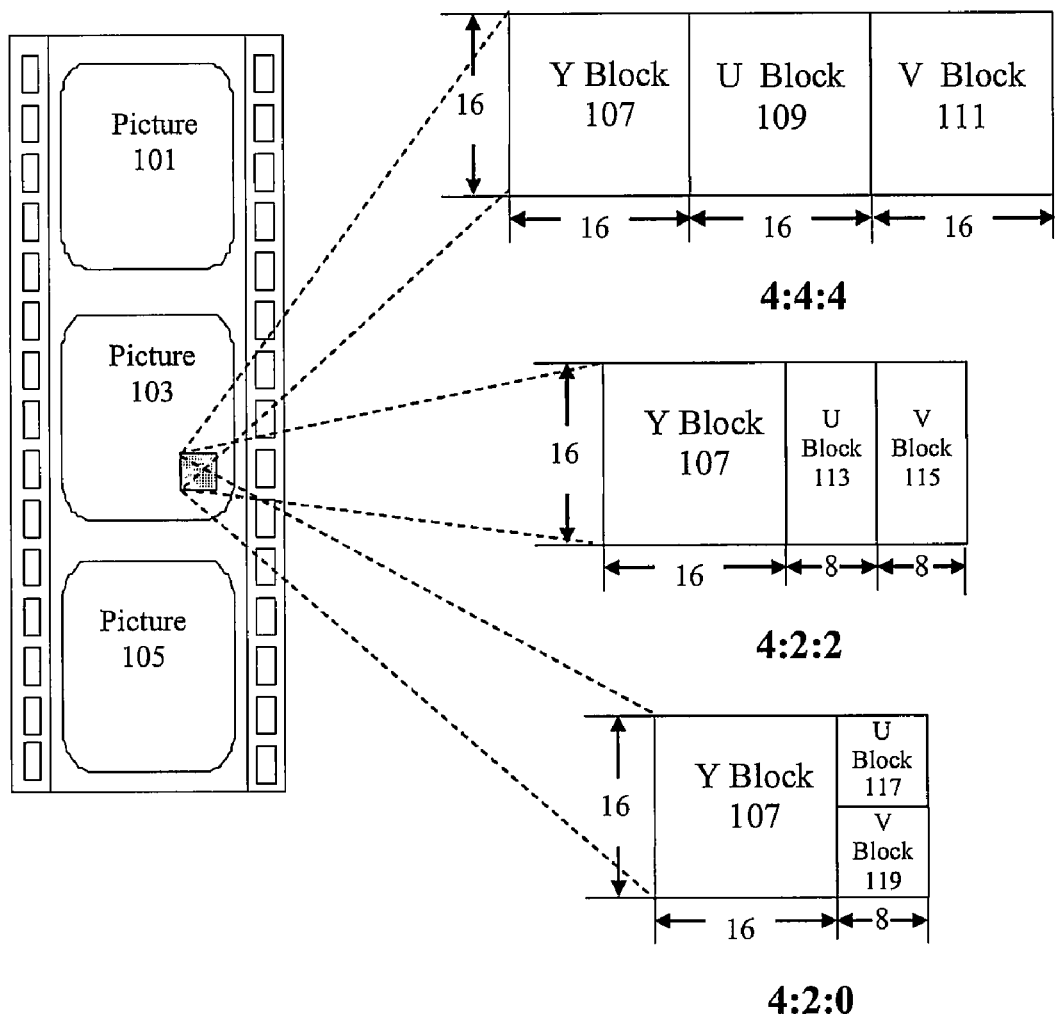
FIG. 1 is a block diagram that illustrates the 4:2:2 video format of an exemplary picture in a video sequence in accordance with an embodiment of the present invention.

Referring now to FIG. 1, there is illustrated a block diagram of an exemplary video sequence comprising pictures 101, 103, and 105. The picture 103, for example, comprises two-dimensional grid(s) of pixels. For color video, each color component is associated with a unique two-dimensional grid of pixels. For example, a picture can include luma, chroma blue, and chroma red components. Accordingly, these components are associated with a luma grid, a chroma blue grid, and a chroma red grid. When these grids are overlaid on a display device, the result is a picture of the field of view at the duration that the picture was captured. Regions of picture 103 may be encoded together. For example, a region of 16×16 pixels may collectively be known as a macroblock.

The 4:4:4 format means that the YUV components are encoded at the same quality. For a particular macroblock, the luma block 107, the chroma blue block 109, and the chroma red block 111 may all comprise data in a 16×16 grid.

The UV color components may also be encoded at a lower quality since the human eye is more perceptive to the luma characteristics of video, compared to the chroma red and chroma blue characteristics.

The 4:2:2 format means that the UV components are decimated in the horizontal direction. In the 4:2:2 format, there are twice as many pixels in the horizontal direction on the luma grid 107 as compared to the chroma blue grid 113 and the chroma red grid 115. The luma grid 107 can be divided into 16×16 pixel blocks. For the luma block 107, there is a corresponding 16×8 chroma blue block 113 and a corresponding 16×8 chroma red block 115.

The 4:2:0 format means that the UV components are decimated in the horizontal and vertical directions. In the 4:2:0 format, there are twice as many pixels in the horizontal direction and twice as many pixels in the vertical direction on the luma grid 107 as compared to the chroma blue grid 117 and the chroma red grid 119. The luma grid 107 can be divided into 16×16 pixel blocks. For the luma block 107, there is a corresponding 8×8 chroma blue block 117 and a corresponding 8×8 chroma red block 119.

Figure 2:
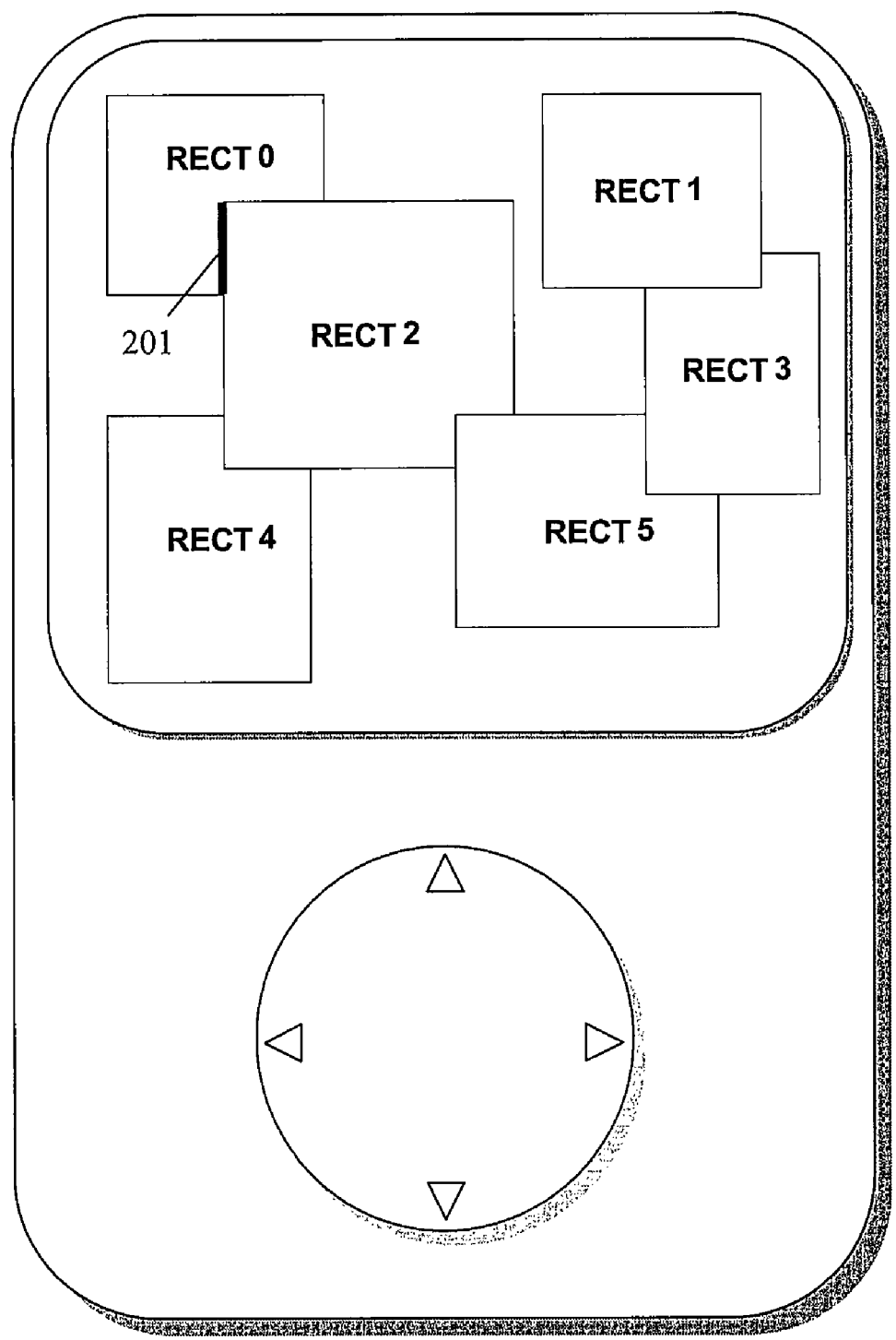
FIG. 2 is a diagram of a picture display in a mosaic mode application in accordance with an embodiment of the present invention.

FIG. 2 is a diagram of a picture display in a mosaic mode application in accordance with an embodiment of the present invention. In a mosaic mode video application, the screen may simultaneously display one or more video windows (RECT0, RECT1, RECT2, RECT3, RECT4 and RECT5). These small video windows are typically smaller than the screen size and may be arranged in any way on the display screen. For example, the small video windows may be displayed as an array of windows on a background or intertwined with each other.

Mosaic mode display application may include decoding of each video stream and capturing each decoded video stream into different regions in a single capture buffer. The capture buffer may then go through the format conversion filter to convert into the desired data format, then displayed as a single video source in the video compositor.

Figure 3:
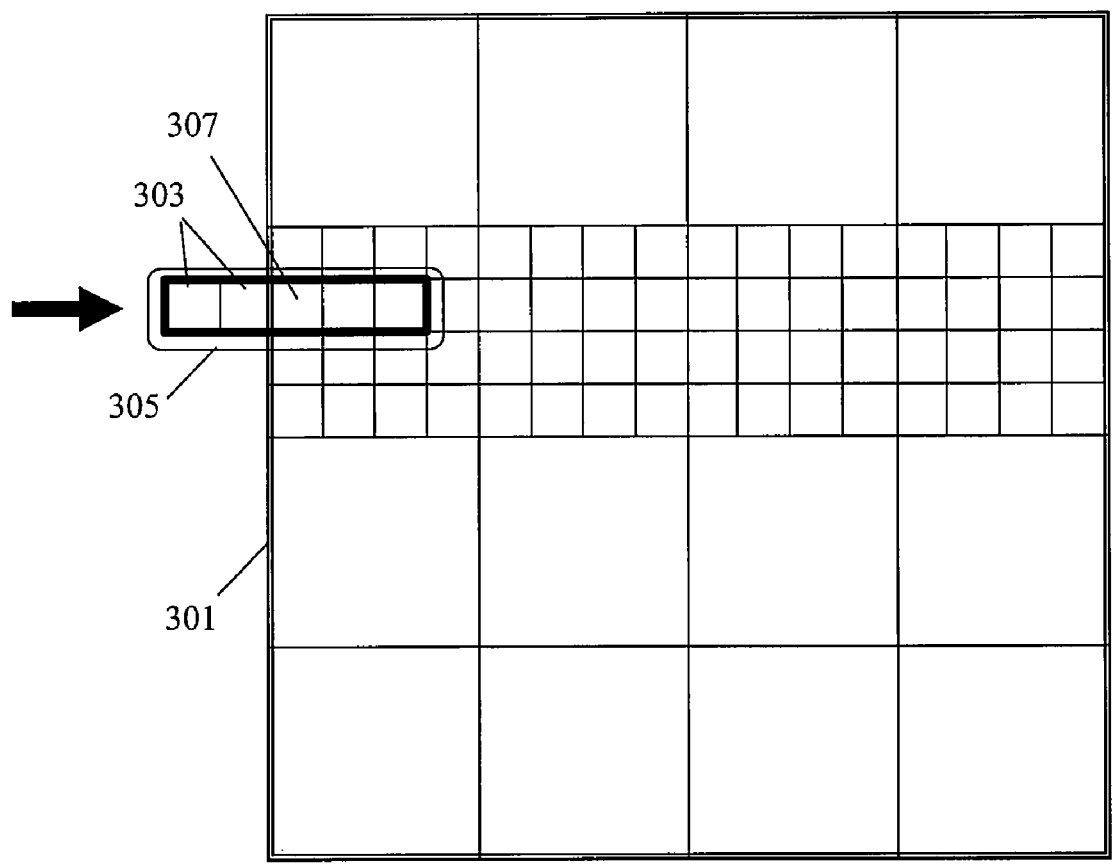
FIG. 3 is a diagram of an exemplary illustration of horizontal filtering in accordance with an embodiment of the present invention.

FIG. 3 is a diagram of an exemplary illustration of horizontal filtering in accordance with an embodiment of the present invention. The digital picture in the small video window, 301, comprises a two-dimensional grid(s) of pixels. During the format conversion process, neighborhood pixels, 303, may be used to construct the output pixels (e.g., by using a horizontal filter, 305). As a result, jagged or blurred edges may appear on the video windows. The extent of these artifacts may depend on the neighboring data along the edges. The artifacts may be very noticeable when the neighboring data, 303, is quite different than the data in the small video window, 301.

Alternatively, the neighboring data, 303, may be replaced by the pixel data, 307, at the corresponding edge of the video window, 301. As a result of repeating this common pixel data, jagged or blurred edge artifacts may not appear on the displayed video window.

Figure 4:
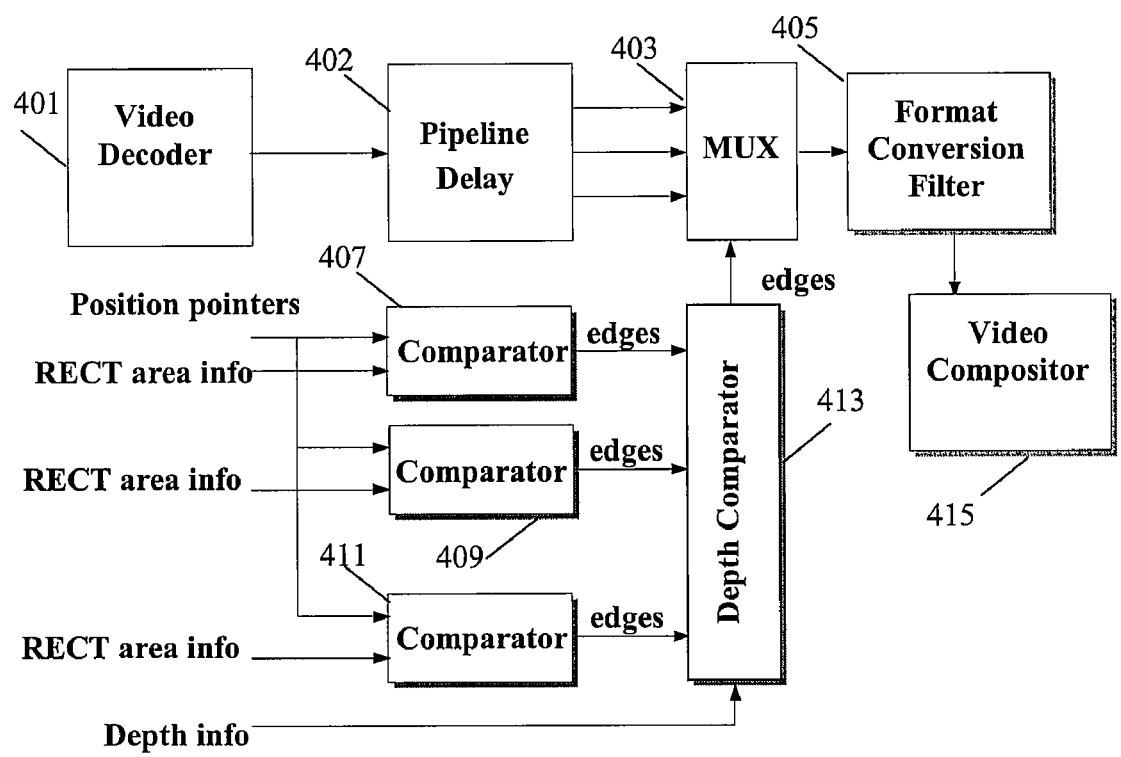
FIG. 4 is a block diagram of an exemplary system for video format conversion in accordance with an embodiment of the present invention.

FIG. 4 is a block diagram of an exemplary system for video format conversion in accordance with an embodiment of the present invention. The system in FIG. 4 uses a region-aware conversion scheme that may remove the artifacts along the window edges.

A video decoder, 401, generates pixel data as an input to a pipeline delay, 402; the output of the pipeline delay, 402, enters a multiplexer (MUX), 403; and the output of the MUX, 403, enters a format conversion filter, 405. The number of taps in the format conversion filter, 405, determines the number of data elements involved in the filter operation, and the associated length of the data pipeline delay, 402, and MUX, 403, operation.

A region-aware conversion system may monitor the edges of mosaic windows in order to apply proper boundary conditions during the conversion process. For example, a region-aware 4:2:2-4:4:4 conversion system will detect the left and right edges of a window; and a region-aware 4:2:0-4:4:4 conversion system will detect the left, right, top and bottom edges of a window.

Multiple windows with area information may be defined and compared by comparators, 407, 409, and 411, in order to determine the relevant edges of each window. This edge information may then be sorted by the Depth Comparator, 413, in order to control the data that is multiplexed, 403, into the filter core, 405. The MUX selection signals may include final edge information after the depth-comparison, 413. The MUX selection signals may control the data to be used in the up-sampling filter core, 405. The up-sampled pixel data may then be displayed by a video compositor, 415.

In 4:2:2 to 4:4:4 conversion, for example, the first pixel data in a row of the current window may replace the otherwise non-related data, thereby eliminating a blurred or jagged output edge. Similarly, the last pixel data in a row of the current window may be used on the right edge. The number of pixels replaced may depend on the number of taps of the filter. For example, a 5-tap filter may replace 2 pixels on both the left and the right edge during 4:2:2 to 4:4:4 conversion.

Figure 5:
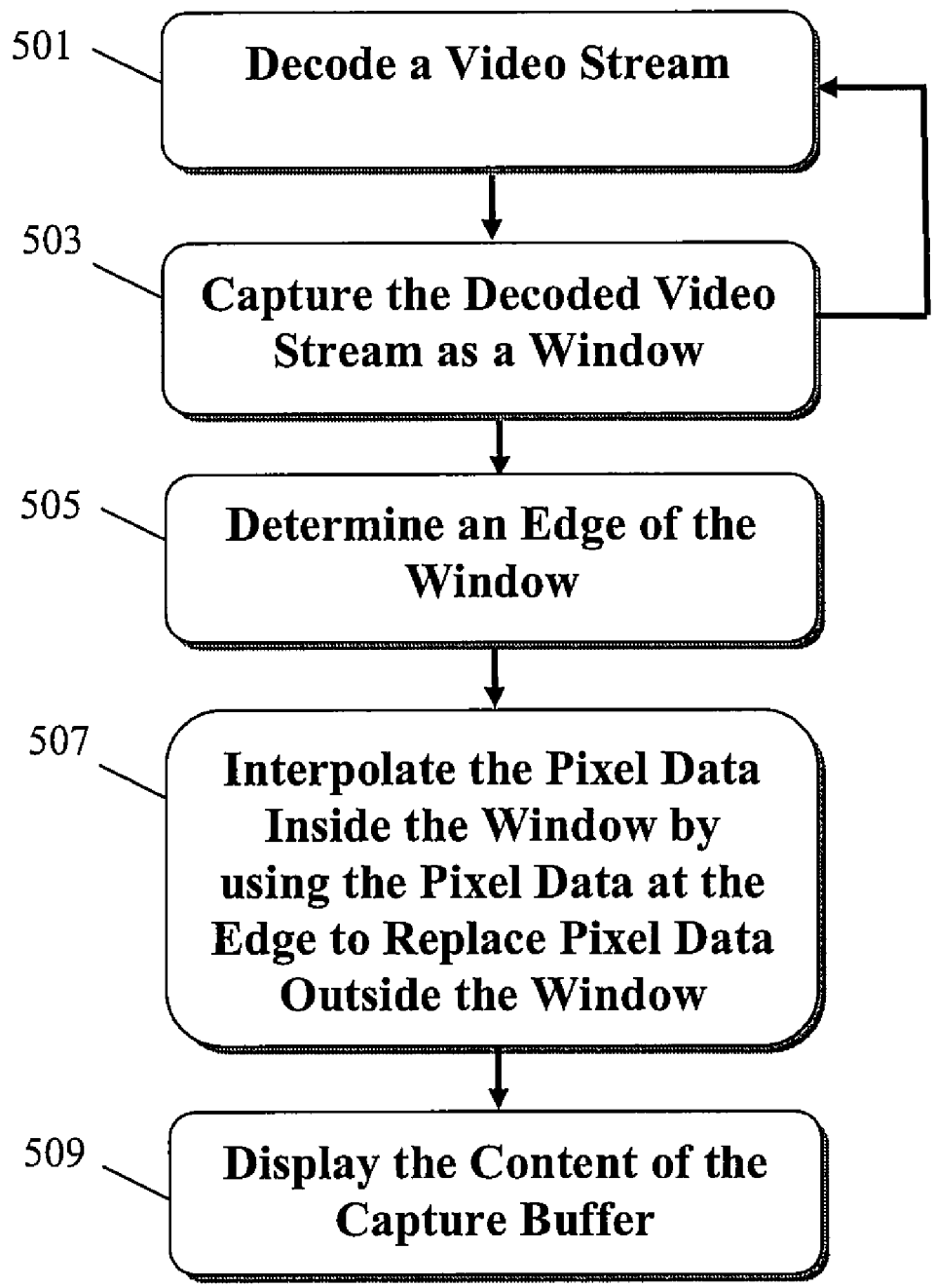
FIG. 5 is a flow diagram of an exemplary method for video format conversion in accordance with an embodiment of the present invention.

FIG. 5 is a flow diagram of an exemplary method for video format conversion in accordance with an embodiment of the present invention. At 501, a video stream is decoded. At 503, the decoded video stream is captured into a region or window in a capture buffer. For multiple video sources, steps 501 and 503 may be repeated to create multiple windows.

At 505, an edge of the window is detected. The edge detection is related to the type of format conversion. The decoded video stream may be of a first format and may be converted to a second format for the output display. For example, the decoded video stream may be converted from the 4:2:2 format to the 4:4:4 format; from the 4:2:0 format to the 4:4:4 format; or from the 4:2:0 format to the 4:2:2 format. In the case of a conversion from 4:2:2 format to 4:4:4 format, the left and right edges will be detected. In the case of a conversion from 4:2:0 format to 4:2:2 format, the top and bottom edges will be detected. In the case of a conversion from 4:2:0 format to 4:4:4 format, the left, right, top and bottom edges will be detected. Additionally, the depth of the window may be considered. An edge may occur as a result of the window being partially covered by another window that is opaque, as seen in FIG. 2. For example, RECT2 overlaps RECT0 and creates a virtual right edge, 201, in RECT0.

At 507, pixel data inside the window is interpolated the by using the pixel data at the edge to replace pixel data outside the window. Pixel data, such as the U and V values, may be repeated as the window is filtered. The number of repeated pixels may depend on the number of taps of the filter. For example, a 5-tap filter may use 2 repeated pixels on each edge. At 509, the capture buffer may be displayed as a single video source in a video compositor.

The embodiments described herein may be implemented as a board level product, as a single chip, application specific integrated circuit (ASIC), or with varying levels of a video conversion integrated with other portions of the system as separate components. An integrated circuit may store data in memory and use logic to encode, detect, and/or format the video output.

The degree of integration of the video conversion circuit will primarily be determined by the speed and cost considerations. Because of the sophisticated nature of modern processors, it is possible to utilize a commercially available processor, which may be implemented external to an ASIC implementation.

If the processor is available as an ASIC core or logic block, then the commercially available processor can be implemented as part of an ASIC device wherein certain functions can be implemented in firmware as instructions stored in a memory. Alternatively, the functions can be implemented as hardware accelerator units controlled by the processor.

While the present invention has been described with reference to certain embodiments, it will be understood by those skilled in the art that various changes may be made and equivalents may be substituted without departing from the scope of the present invention.

Additionally, many modifications may be made to adapt a particular situation or material to the teachings of the present invention without departing from its scope. For example, although the invention has been described with a particular emphasis on one encoding standard, the invention can be applied to a wide variety of standards.

Therefore, it is intended that the present invention not be limited to the particular embodiment disclosed, but that the present invention will include all embodiments falling within the scope of the appended claims.

The invention claimed is:

1. A method for video format conversion, said method comprising:
   capturing pixel data of a first subsampling color format in a window in a capture buffer;
   detecting an edge of the window, wherein the edge of the window is adjacent to pixel data that is outside the window; and generating pixel data of a second subsampling color format in the window by using the pixel data of the first subsampling color format at the edge of the window in place of the pixel data that is outside the window, wherein the generating is based on replacing the pixel data that is outside the window with pixel data that is within the window.

2. The method of claim 1, wherein the method comprises decoding a video stream to generate the pixel data of the first subsampling color format.

3. The method of claim 1, wherein the method comprises displaying the pixel data of the second subsampling color format.

4. The method of claim 1, wherein generating the pixel data of the second subsampling color format comprises interpolating the pixel data of the first subsampling color format.

5. The method of claim 1, wherein generating the pixel data of the second subsampling color format comprises filtering the pixel data of the first subsampling color format.

6. The method of claim 5, wherein a horizontal filter is applied to the pixel data of the first subsampling color format.

7. The method of claim 6, wherein the edge of the window is adjacent to pixel data that is outside the window to the left or adjacent to pixel data that is outside the window to the right.

8. The method of claim 5, wherein a vertical filter is applied to the pixel data of the first subsampling color format.

9. The method of claim 8, wherein the edge of the window is adjacent to pixel data that is outside the window to the top or adjacent to pixel data that is outside the window to the bottom.

10. The method of claim 1, wherein the edge of the window is formed by overlaying an unrelated image in front of the window in the capture buffer.

11. A system for video format conversion, said system comprising:
a capture buffer configured to capture pixel data of a first subsampling color format in a window;
a comparator configured to detect an edge region of the window, wherein the edge region of the window is adjacent to pixel data that is outside the window; and
a format conversion core configured to generate pixel data of a second subsampling color format in the window by using the pixel data of the first subsampling color format at the edge region of the window in place of the pixel data that is outside the window, wherein the generation is based on replacing the pixel data that is outside the window with pixel data that is within the window.

12. The system of claim 11, wherein the system comprises a video decoder configured to generate the pixel data of the first subsampling color format.

13. The system of claim 11, wherein the system comprises a video compositor configured to display the pixel data of the second subsampling color format.

14. The system of claim 11, wherein the format conversion core is configured to generate the pixel data of the second subsampling color format by interpolating the pixel data of the first subsampling color format.

15. The system of claim 11, wherein the format conversion core comprises a filter configured to generate the pixel data of the second subsampling color format.

16. The system of claim 15, wherein the filter is a horizontal filter or a vertical filter.

17. The system of claim 15, wherein the system comprises a pipeline delay, and wherein the length of the pipeline delay is according to the length of the filter.

18. The system of claim 11, wherein the edge region of the window is formed by overlaying an unrelated image in front of the window in the capture buffer.

19. The system of claim 11, wherein the system comprises a depth detector configured to receive the comparator output to determine a final edge.

20. The system of claim 19, wherein the final edge is dependent on the opacity of another window in the capture buffer.

21. The system of claim 19, wherein the system comprises a multiplexer configured to select the input to the format conversion core according to the final edge.

22. The system of claim 19, wherein the final edge of the window is determined according to an unrelated image in front of the window in the capture buffer.

23. A method for video format conversion, said method comprising:
capturing pixel data of a first sampling color format in a window in a capture buffer;
detecting an edge of the window, wherein the edge of the window is adjacent to pixel data that is outside the window; and
generating pixel data of a second sampling color format in the window based on an interpolation using the pixel data of the first sampling color format at the edge of the window in place of the pixel data that is outside the window, wherein the generating is based on replacing the pixel data that is outside the window with pixel data that is within the window.

24. The method of claim 23, wherein the first sampling color format comprises a subsampling color format.

25. The method of claim 23, wherein the second sampling color format comprises a subsampling color format or a 4:4:4 color format.

* * * * *